United States Patent [19]

Miyamatsu et al.

[11] Patent Number: 5,221,289
[45] Date of Patent: Jun. 22, 1993

[54] DYED TEXTILE PRODUCTS AND A METHOD OF PRODUCING THEM

[75] Inventors: Hiroki Miyamatsu, 631, Terajima-cho, Hamamatsu, Shizuoka 430; Okihiro Kawai, Hamamatsu; Koji Morita, Nara; Michinori Kubo, Sakai, all of Japan

[73] Assignee: Hiroki Miyamatsu, Hamamatsu, Japan

[21] Appl. No.: 904,323

[22] Filed: Jun. 25, 1992

[30] Foreign Application Priority Data

Jun. 26, 1991 [JP] Japan ................. 2-183094

[51] Int. Cl.$^5$ ............ C09B 61/00; D06P 5/12; D06M 10/08; C12N 9/04
[52] U.S. Cl. ............................. 8/646; 8/438; 8/452; 8/460; 8/625; 8/636; 8/685; 252/86; 252/88; 252/89; 435/190; 435/191
[58] Field of Search ............ 8/646, 438, 460, 452, 8/625, 636, 685; 435/190, 191; 252/8.6, 8.8, 8.9

[56] References Cited

U.S. PATENT DOCUMENTS

| | | | |
|---|---|---|---|
| 3,944,383 | 3/1976 | Davis | 8/662 |
| 4,568,645 | 2/1986 | Koths et al. | 435/190 |
| 4,569,910 | 2/1986 | Koths et al. | 435/190 |
| 4,569,913 | 2/1986 | Koths et al. | 435/190 |
| 4,569,915 | 2/1986 | Ring | 435/190 |
| 4,735,218 | 4/1988 | Akiko et al. | 131/331 |
| 4,738,682 | 4/1988 | Boegh et al. | 8/401 |
| 5,123,203 | 1/1992 | Hiromoto | 435/254 |

FOREIGN PATENT DOCUMENTS 2-234988 9/1990 Japan.

*Primary Examiner*—Paul Lieberman
*Assistant Examiner*—William S. Parks
*Attorney, Agent, or Firm*—Armstrong, Westerman, Hattori, McLeland & Naughton

[57] ABSTRACT

A dyed textile article treated with tannic acid and dyed with an extract of mycelia or basidiocarps of *Ganoderma lucidum*. This article is produced by a process comprising contacting a substrate article of cotton, linen, silk or wool first with a pretreating bath containing tannic acid or a natural material containing tannic acid, e.g. gall, then with a mordant bath containing an alumina mordant, such as grass or wood ashes, and finally with the mycelia or basidiocarps of *Ganoderma lucidum*. This dyed textile article has not only a natural color and feeling, with a sufficient depth of color, but also antimicrobial and antiallergic functions.

5 Claims, No Drawings

DYED TEXTILE PRODUCTS AND A METHOD OF PRODUCING THEM

FIELD OF THE INVENTION

The present invention relates to dyed textile articles having a natural and unique color tone and feeling, dyed to a deep and fast shade, and having antimicrobial and antiallergic properties. The invention further relates to a method of producing such dyed textile articles.

BACKGROUND OF THE INVENTION

It is long since natural colors were superseded by synthetic dyes but as "Kusaki-zome" or herbal dyeing can produce dyed articles with unique quiet, exquisite and subtle sheen and handle, natural colors have again been receiving due respect in recent years which are epitomized by general trends towards favoring naturalness.

The term "herbal dyeing" inherently means dyeing with plant-derived coloring matters. While, actually, a great majority of natural colors are of vegetable origin, a broad class of colors including animal dyes, such as cochineal and purple of the ancients (secretions of *Murex brandaris*, a sea snail) and mineral dyes, such as Berlin (Prussian) blue, is sometimes referred to as herbal dyes.

The natural colors applicable to herbal dyeing include coloring matters available from a large variety of plants such as *Gardenia jasminoides* (gardenia), Curcuma longa (turmeric), *Phellodendron amurense* (amur cork tree), *Sagina japonica, Polygonum tinctorium, Carthamus tinctorius* (safflower), *Sophora japonica* (Japanese pogada tree), *Uncaria gambir* (gambir), *Prunus mume* (Japanese apricot), cherry tree, *Punica granatum* (pomegranate), *Thea sinensis* (tea), *Ternstoremia gymnanthera* (evergreen tree), *Rubia cordifolia* (madder), *Caesalpinia sappan* (sappan wood), lithospermum, *Rhus javanica* (Japanese sumac), *Eurya japonica, Artemisia princeps* (wormwood), *Miscanthus sinensis* (eulalia), *Chrysanthemum morifolium var. sinense* (Chinese chrysanthemum), *Nandia domestica. Mahonia japonica* (Japanese mahonia), *Pueraria lobata* (kudzu-vine), *Quercus acutissima* (kind of oak), *Quercus myrsinaefolia* (bambooleafed oak), *Geranium thunbergii* (cranesbill), *Rodgersia podophylla, Myrica rubra* (bayberry), *Juglans mandshurica* (walnut), *Haematoxylon campechianum* (log wood), *Quercus dentata* (Daimyo oak), morning glory, *Rosa hydrida* (rose), *Crocus sativus* (saffron), *Tagetes patula, Vitis coignetiae* (glory vine), eggplant, acorn, *Miscanthus tinctorius* (eulalia), azalea, *Coptis japonica* (goldthread), *Rosa rugosa* (Japanese rose), *Cryptomeria japonica* (Japanese red cedar), *Chamaecyparis obtusa* (hinoki cypress), pine, *Osmanthus heterophyllus, Prunus persica* (peach tree), *Houttuynia cordata, Lespedeza bicolor var. japonica* (bush clover), Japanese persimmon tree, *Castanea crenata* (Japanese chetnut tree), *Phaseous angularis, Glycine max, Rhus succedanea* (wax tree), *Solidago altissima* (tall golden-rod), *Allium cepa* (onion), *Taxus cuspidata* (Japanese yew), *Alnus japonica* (Japanese alder), *Pieris japonica* (Japanese andromeda), *Albizzia julibrissin* (silk flower), etc.

Several proposals have also been made concerning the use of fungi and other microorganisms, algae, etc. or their metabolic products as dyestuffs.

Japanese Patent Kokai Publication No. 234988/1990 discloses a dyeing process employing shiitake (a variety of mushroom, *Cortinellus shiitake*) which comprises boiling *shiitake* to extract a color principle, dyeing a fabric with the extract and developing and fixing the color with a mordant. This process is described as "piece mordant dyeing" method employing an infusion of wood ash as the mordant.

Japanese Patent Kokai Publication No. 132886/1989 describes a method of dyeing a textile article which comprises dispersing a microfine powder of quartz porphyry in a water-soluble acrylic resin solution, pouring the dispersion in hot water, adding a plant extract and a dyestuff thereto, dipping a substrate textile product in the resulting dye bath and carrying out the usual aftertreatments such as soaping and drying.

While this technology is intended to enhance the warmth-retaining property of textile products by taking advantage of the far-infrared light emission from quartz porphyry, the invention claims such additional functions as further warmth retention, cold retention and mothproofing through the concomitant use of a plant extract. As plant extracts for warmth retention, garlic, Chinese pepper, polypore, *Kasi,* Euchresta japonica, *Bandai kinori, Bandai udo,* polygonum fruit, comfrey, Chinese matrimony vine fruit, aloe leaf, chrolera, etc. are employed. For cold retention, citrus plants such as mandarin orange, orange, etc. are used. When mothproofing is the objective, the barks and leaves of hinoki cypress and other trees are employed. However, plant extracts are not used as dyes, and as dyestuffs, natural colors (those used in herbal dyeing) and synthetic dyes are additionally employed.

An article in the May 22, 1991 issue of the Nikkei Sangyo Shinbun covered a method of dyeing silk which comprises cutting the stalk of *reishi* (*Ganoderma lucidum*), a bracket fungus of the genus *Ganoderma*, into fine fragments, boiling them to prepare an extract, bottoming a woven fabric with this extract, then coloring it with a man-made dyestuff and finally dusting spores of *reishi* thereon.

The conventional herbal dyeing is not only complicated in dyeing procedure but inferior in dye reception and color fastness, particularly in the case of cotton and linen, so that the unique characteristic of the coloring substance is not lasting and this has been the greatest shortcoming of herbal dyeing.

Moreover, although herbal dyeing is just in line with the current general trend towards favoring naturalness, it has the limit of being not necessarily conducive to development of new functions. In this respect, the *shiitake* dyeing described in Japanese Patent Kokai Publication No. 234988/1990 deserves attention only in that as an uncommon kind of coloring material is used for herbal dyeing. Unless a dyeing method leads to development of a new function, it is not different from dyeing with a synthetic dyestuff.

The dyeing process proposed by Japanese Patent Kokai Publication No. 132886/1989 comprises adding quartz porphyry and a plant extract to a synthetic dye bath to exploit the warmth-retaining feature of the far-infrared light emission from quartz porphyry and the warmth-and-cold retaining and mothproofing actions of the plant extract but inevitably the deposit of quartz porphyry on the textile article detracts from its handle and when a natural color is used as the dyestuff, the fastness of the color obtainable is not satisfactory.

In the technology reported in the May 22, 1991 issue of the Nikkie Sangyo Shinbun, bottoming is performed with reishi but the bottoming is a pretreatment and the actual is dyeing performed with a man-made dyestuff. The above article says, "Reishi builds up colors, viz. blue, red, yellow and purple" and "the stalk of reishi is cut into fine fragments and boiled to prepare an extract". However, although reishi occurs in six kinds, namely, seishi (blue), sekishi (red), ooshi (yellow), hakushi (white), kokushi (black) and shishi (purple), it is not true that reishi builds up colors and, moreover, they use the stalk (stipe) which is less useful than the "cap (pileus)" which is rich in activity. Thus, both factually and technically, there are several doubtful points. After all, the dyed product mentioned in this article is not a product dyed with reishi to reproduce "the color of reishi" but nothing more than a woven fabric given a deluxe feeling by pretreatment with an extract of the stalk of reishi or dusting with spores of the fungus.

The present invention has been developed, against the above background, to provide a dyed textile article having the natural and unique hue and feeling of reishi, with sufficient depths of color and extremely high color fastness, and even having antimicrobial and antiallergic activities.

SUMMARY OF THE INVENTION

The dyed textile article according to the invention has been treated with tannic acid and dyed with an extract of the mycelium (hyphae) or basidiocarp (fruiting body) of reishi.

The method of producing a dyed textile article according to the invention comprises contacting a substrate textile article with a pretreating bath containing tannic acid, then with a mordant bath containing an alumina mordant for fixation of tannic acid and further with a dye bath containing an extract of the mycelium or basidiocarp of reishi.

DETAILED DESCRIPTION OF THE INVENTION

The textile article as the term is used in this specification and the claims appended thereto means any and all of raw fibers, slivers, yarns, piles, flocs, woven fabrics, knitted fabrics, nonwoven fabrics, implanted fabrics and so on. In addition, paper and wood products should also be regarded as textile articles in the context of the invention.

The raw materials for such textile articles are not limited but include cotton, linen, silk, wool, etc., inclusive of blends, mix-spuns, mix-wovens and mix-knits thereof with chemical or synthetic fibers. However, it is one of the outstanding features of the invention that the technology is applicable to cotton and linen which are usually not sufficiently receptive to herbal dyeing systems and not satisfactory in color fastness.

In accordance with the invention, the substrate fabric is desized, scoured, bleached and otherwise pretreated and, then, contacted with a pretreating bath containing tannic acid.

While tannic acid may be a purified product, an extract of a plant of high tannic acid content, such as Japanese gall, gall, etc. or a semi-processed preparation thereof can be advantageously utilized. Japanese gall contains about 60to 75% of tannic acid and gall contains about 55to 65%. Pure tannic acid may also be regarded as a natural substance because it can be obtained by a process comprising crushing Japanese gall or gall, extracting it with a mixture of ether and ethanol, adding water to the extract to transfer tannic acid into the aqueous phase and, if necessary, further purifying the aqueous solution.

The bath ratio for tannic acid pretreatment is about 10 to 100 times (particularly about 20 to 60 times) based on the weight of the textile article. The bath temperature is about 50° to 95° C. (particularly about 60° to 90° C.) and the treating time is about 10 minutes to 2 hours (particularly about 20 minutes to 1.5 hours). The concentration of tannic acid is usually about 5 to 20% by weight based on the weight of the textile product, although the range is not exclusive.

After tannic acid pretreatment, the textile article may be a 1-3% (by weight) solution of tartar emetic (potassium antimony tartarate) for fixation of tannic acid but since the fixation of tannic acid may be achieved in the next mordanting stage, this step may be omitted.

Following said tannic acid pretreatment, the textile article is contacted with a mordant bath containing an alumina mordant for fixation of tannic acid and mordanting. This process is very important and unless it is carried out, both dyeing affinity and color fastness will be poor in the next dyeing stage.

The alumina mordant mentioned above includes, among others,
(1) Aluminum salts such as aluminum acetate, aluminum sulfate, aluminum chloride, alum, burnt alum, potassium alum, etc.;
(2) Commercial aluminum solutions;
(3) Wood and straw ashes or combinations thereof with (1) and/or (2);
(4) Ashes of aluminum-rich grasses and trees, particularly ashes of tsubaki (*Camellia japonica*) and trees belonging to the family Symplocaceae, such as sawafutagi (*Symplocos chinensis f. pilosa*), hisakaki (*Eurya japonica*), etc., kunugi (*Quercus acutissima*), akaza (*Chenopodium album*) var. *centrorubrum*, early-ripening rice straw, etc., or combinations thereof with (1) and/or (2); and
(5) Combinations of any of (1) through (4) with an alkali such as potassium carbonate, sodium carbonate, potassium hydroxide, sodium hydroxide and so on.

Though chemical substances, among them, can be used for fixation and mordanting, it is particularly desirable to use natural wood or straw ashes in order to emphasize the natural feeling which is one of the characteristics of the invention. Particularly preferred are ashes of aluminum-rich grasses or trees such as tsubaki (*Camellia japonica*) and trees of the family Symplocaceae, e.g. sawafutagi (*Symplocos chinensis f. pilosa*), hisakaki (*Eurya japonica*), etc. Mordants other than alumina mordants are also known. For example, iron mordants (iron salts), copper mordants (copper salts), tin mordants (tin salts), chromium mordants (chromium salts), etc. are known for use as mordants in herbal dyeing. These mordants can of couse be employed but in consideration of the fact that these mordants tend to produce colors characteristic of the respective metal ions and thereby make it difficult to achieve the feeling intrinsic to herbal dyeing or may cause clouding of the color and the fact that, in light of the nature of the invention, it is preferable to employ a metal salt harmless to the ecology, these mordants are not necessarily suited for the object of the invention. However, when the above-mentioned alumina mordant is used as a main ingredient of the bath, the concomitant presence of metal salts other than salts of aluminum does not constitute a major disadvantage.

The mordant bath ratio is about 1:10 to 1:100 (particularly 1:20 to 1:60). The bath temperature may range from ordinary temperature to boiling temperature, the treating time is about 10 minutes to 1 hour, and the concentration of the alumina mordant is usually about 3 to 15% by weight, as aluminum ion, although these ranges are not critical.

After said tannic acid pretreatment and mordanting, the textile article is dyed by contacting it with a dye bath containing an extract of the mycelium or basidiocarp of reishi. What is important is that dyeing is preceded by tannic acid treatment and mordanting. If mordanting is performed after dyeing, the desired effect will not be obtained.

*Ganoderma lucidum* is a species of the genus *Ganoderma*, the family *Polyporales*, the order *Aphyllophorales* of *Basidiomycetes*, and is distinct from fungi of the genus *Oxyporus*. Polypore (a shelf pore fungus), which is a well-known folk medicine, belongs to the genus *Oxyporus* and is dissimilar to reishi in all of appearance, morphology and pharmaceutical efficacy.

Regarding reishi, the Shinno Honzo Kyo (Herbs Sutra of Shinno), the source book of Kampo medicine, mentions six kinds, namely seishi (blue), sekishi (red), ooshi (yellow), hakushi (white), kokushi (black) and shishi (purple), and describes the pharmaceutical efficacy of each. Reishi is, thus, one of the timehonored kampo drugs and today many scientific reports are available which describe that reishi has such varied pharmacological activities as antiallergic, macrophage activating, antitumor, antihypertensive, hypoglycemic, antihyperlipidemic and antithrombotic activities.

There are some literature reporting that the pharmaceutical efficacy of reishi varies a great deal according to the place of gathering, harvest time and strain. Kyoritsu Pharmaceutical Industries Co., Ltd., from which the inventors of the present invention received a donation of reishi, conducted an efficacy screening with a large number of strains of *Ganoderma lucidum* (reishi) gathered in various localities, using experimental antialergic activity as an indicator, and found that an extract of the strain which they had discovered in Yamashiro, Nara Prefecture, Japan and succeeded in cultivation exhibits potent inhibitory activity in various allergy models. They named the strain "Kyoritsu I Reishi". Therefore, although there is no limitation on gathering place or strain for proposes of the present invention, it is particularly advantageous to employ "Kyoritsu I Reishi" which the manufacture claims is highly effective against various allergic deseases such as bronchial asthma, allergic rhinitis, atopic dermatitis, urticaria, drug allergy and so on. In this manner, the desirable antimicrobial and antiallergic functions can be imparted to dyed textile articles. It should be understood that the use of other strains of reishi also provides dyed textiles having the like properties.

As the raw reishi material, the mycelium and/or basidiocarp of this fungus can be utilized. Thus, when the mycelia or basidiocarps of reishi are extracted with water or/and a hydrophilic organic solvent (e.g. alcohol), there is obtained an extract of the active principle (glycoprotein conjugates etc.). If necessary, this extract can be subjected to dialysis or utrafiltration or to further extraction. As the preferred technique for extracting the active principle from reishi, the method disclosed in Japanese Patent Kokai Publication No. 72629/1988 (applicant: Kyoritsu Pharmaceutical Industries, Co. Ltd.) may be mentioned by way of example.

The bath ratio for dyeing reaction is generally about 10 to 100 times (particularly about 20 to 60 times). The bath temperature is generally about 50° to 95° C. (particularly about 60° to 90° C.) and the treating time is generally about 20 minutes to 3 hours (particularly about 30 minutes to 2 hours). However, these ranges are not critical. The dye concentration can be selected, within a broad range, according to the intended application.

After completion of the dyeing process, the textile article is subjected to after-treatments such as soaping, rinse, etc. and allowed to dry or dried in a hot current of air.

The above procedure yields a textile article treated with tannic acid and dyed with an extract of the mycelium or basidiocarp of reishi.

Since the dyeing reaction is preceded by treatment with tannic acid and mordanting in the present invention, the dyeing reaction with the reishi extract proceeds smoothly and, at the same time, the binding between the active substance of reishi and the textile article is positively accomplished, with the result that the article is dyed to a deep shade and the color is very fast.

The dyeing with a reishi extract not only yields a natural, unique hue and feeling but, because the active substance of reishi is securely bound, imparts to textile articles an antiallergic function. Thus, the dyed articles are kind to the skin, have a skin-conditioning effect, and suppress itchy sensation.

It has also been found that the dyed textile article of the invention has an antimicrobial function. It seems that this effect is derived not only from the antimicrobial activity of the tannic acid bound to the textile article but also from the antimicrobial action of the reishi extract. This antimicrobial function is biostatic activity, which means that it does not affect the physiological system of man, and, therefore, the dyed textile article of the invention can be used for therapeutic purposes, that is to say by patients with skin disease or pruritus.

Therefore, the dyed textile article of the invention is particularly useful for products which come into contact with the skin in use, such as underwear, shirts, nightclothes, sheeting, gloves, caps, sportsman's supporters, bathing wear, bandages, clothing for patients, masks and so on. Furthermore, because of its fashionable qualities, the dyed textile article of the invention finds application as other products which are not brought into contact with the skin.

The flowing examples are intended to illustrate the invention in further detail. In the examples, all parts and % are by weight. The symbol % of stands for percentage of the weight of the substrate textile article.

EXAMPLE 1

In 280 ml of water was dissolved 10.5 g (15% owf) of tannic acid to prepare a pretreating both (bath ratio 1:40) and one sheet of Egyptian cotton cloth weighing 70 g was immersed in the bath. The bath was heated to 85° C. and maintained at the same temperature for about 60 minutes. After cooling, the cloth was dehydrated.

The cotton cloth pretreated with tannic acid as above was then immersed in a suspension of 35 g (50% owf) of ashes of sawafutagi (*Symplocos chinensis* f. *pilosa*) in 2800 ml of water (bath ratio 1:40) and the bath was boiled with stirring for 15 minutes to complete mordanting. The cloth was then rinsed twice and air-dried.

In 2100 ml of water was suspended 14 g (20% owf) of the basidiocarps (tradename: Reishi B) of Kyoritsu I Reishi (manufactured by Kyoritsu Pharmaceutical Industries Co. Ltd.), followed by addition of 0.21 g of soda ash and boiling for extraction. After cooling, the pH of the extract was adjusted to 5.0 with 0.17 ml of acetic acid.

This stock solution of reishi was diluted with water to make 2800 ml bath ratio 1:40) and the Egyptian cotton cloth pretreated and mordanted as above was immersed into the bath. The bath was heated to 85° C. with stirring and dyeing was performed at this temperature for about 50 minutes. After dyeing, the cloth was rinsed twice, dehydrated and air-dried. In this manner, the desired reishi-dyed cotton cloth was obtained.

The dyed cotton cloth thus obtained had a natural, unique hue (beige with a tinge of gold), with pleasing handle and feeling.

Using testpieces (2 cm×2 cm) of the above dyed cotton cloth, an antibacterial activity assay was carried out in accordance with the new method for antibacterial activity assay (JOURNAL OF ANTIBACTERIAL AND ANTIFUNGAL AGENTS, JAPAN, 16, 2, 49–57, 1988)

Media: nutrient broth and nutrient agar
Tester strains: $E.\ coli$ ATCC 25922 and $S.\ aureus$ ATCC 25923.

As a result, the cloth showed overt antibacterial activity against these strains, as follows.

$E\ coli$ ATCC 25922
  Initial cell count: $1.38 \times 10^5$ cells/g (cloth)
  Viable cell count: $4.70 \times 10^4$ cells/g (cloth)
  Activity CA (bactericidal): 65.9%
$S.\ aureus$ ATCC 25923
  Initial cell count: $3.27 \times 10^5$ cells/g (cloth)
  Viable cell count: 0 cells/g (cloth)
  Activity CA (bactericidal): 100%

The Hamamatsu Testing Laboratory of Japan Textile Inspection Association, Inc. was requested to perform four kinds of fastness tests with this reishi-dyed cotton cloth.

(1) Light fastness test (the test for investigating the influence of ultraviolet and infrared rays of solar radiation, fluorescent light, etc.)
(2) Laundering resistance test (the test in regard to the degree of decolorization under usual settings and whether the color is transferred to a white fabric laundered together; since herb-dyed fabrics often discolor on laundering with a weakly alkaline detergent, particular care must generally be exercised.)
(3) Perspiration test (the test to see whether the testpiece is discolored by human sweat (alkaline, acidic).
( (4) Rubbing fastness test (the test to see whether the color is transferred by friction).
(for practical purposes, the rating of grade 3 or higher is acceptable).

According to the report from the Laboratory, the ratings of the dyed cloth of this example were grade 4 for light fastness, grade 4–5 for laundering resistance, both with a neutral detergent and a weakly alkaline detergent, grade 4–5 for perspiration resistance, and grade 4 for rubbing fastness. Thus, the dyed cloth of this example was rated high in all the four tests. It has, thus, been objectively proven that the reishi-dyed cotton cloth of the invention has qualities which have never been obtained by herbal dyeing.

A large number of pieces of reishi-dyed cloth were prepared in the same manner as above and sewn into underwear, and under the guidance of the Department of Botany, Faculty of Pharmaceutical Sciences of Kinki University, a panel of 10 volunteers with sensitive skin was instructed to wear the underwear and compare the result of use with that of wearing the usual cotton underwear. As a result, 8 of the panelists answered "effective" and 2 gave the rating of "very effective".

EXAMPLE 2

The procedure of Example 1 was repeated except that an extract of Japanese gall was used in lieu of 10.5 g (15% owf) of tannic acid. As a result, there was obtained a reishi-dyed cotton cloth comparable to the cloth of Example 1 in color tone, feeling, handle, fastness, antimicrobial activity and kindness to skin (antialergic effect).

COMPARATIVE EXAMPLE 1

The procedure of Example 1 was repeated except that the fixation with a suspension of ashes of sawafutagi (*Symplocos chinensis* f. *pilosa*) was omitted. The resulting dyed cloth was insufficient in the depth of color and uneven in color. Moreover, it was not satisfactory in color fastness to laundering. Thus, this dyed cloth was by far inferior to the dyed cloth of Example 1.

COMPARATIVE EXAMPLE 2

The stalk of reishi was cut into small pieces and boiled in water. This extract was diluted with water to make 2800 ml (bath ratio 1:40) and one sheet of Egyptian cotton cloth weighing 70 g was immersed in the bath and stirred. The bath was heated to 85° C. and dyeing was carried out at this temperature for about 50 minutes. After completion of dyeing, the cloth was rinsed twice, dehydrated and air-dried.

The resulting dyed cotton cloth was markedly insufficient in the depth of color and uneven in color. Moreover, it was unsatisfactory in color fastness to laundering. Thus, this dyed cloth was by far inferior to the dyed cotton cloth obtained in Comparative Example 1.

COMPARATIVE EXAMPLE 3

The procedure of Example 1 was repeated except that the commercial chromium, iron, copper and tin mordants were respectively used in lieu of the suspension of ashes of sawafutagi (*Symplocos chinensis* f. *pilosa*). The resulting dyed cloth was lacking in the natural, unique color tone expected from reishi. uneven in color and poor in laundering fastness. Thus, this dyed cotton cloth was obviously inferior to the dyed cloth obtained in Example 1.

EXAMPLE 3

In 2800 ml of water was dissolved 10.5 g (15% owf) (as tannic acid) of an extract of Japanese gall (bath ratio 1:40) to prepare a treating bath. Then, a piece of linen cloth weighing 70 g was immersed in the bath and heated at 80° C. for about 60 minutes. After cooling, the cloth was dehydrated.

To 420 ml of water was added 84 g of tsubaki (*Camellia japonica*) ashes and the mixture was boiled for 30 minutes to prepare a wood ash solution. This solution was made up to 2800 ml with a solution of 4.2 ml of a commercial aluminum solution for linen in 1 l of water and the balance of water.

The linen cloth pretreated with tannic acid as above was put in this bath and mordanted at 85° C. with stirring for 15 minutes. The cloth was then rinsed twice, dehydrated and air-dried.

To 500 ml of water was added 17.5 g (25% owf) of the basidiocarps of Kyoritsu I Reishi (manufactured by Kyoritsu Pharmaceutical Industries Co., Ltd.) followed by addition of 0.05 g of soda ash. The mixture was boiled for 60 minutes for extraction. After cooling, the pH was adjusted to 5.0 with 0.2 ml of acetic acid.

The above reishi extract was diluted with water to make 2800 ml (bath ratio 1:40) and the linen cloth pretreated and mordanted as above was immersed in the bath. The bath was heated to 85° C. with stirring, and dyeing was performed at this temperature for about 50 minutes. After completion of dyeing, the cloth was rinsed twice, dehydrated and air-dried. The above procedure gave the desired dyed linen cloth.

This dyed linen cloth had a natural, unique hue (beige with a tinge of gold), with exquisite feeling and handle.

The depth of color, color fastness, antimicrobial activity and kindness to skin (antiallergic function) of this dyed linen cloth were as satisfactory as those of the dyed cloth obtained in Example 1.

EXAMPLE 4

In 500 ml of water was dissolved 1.5 g (15% owf) of tannic acid (bath ratio 1:50) to prepare a treating bath and a piece of silk cloth weighing 10 g was immersed in the bath. The temperature was increased to 85° C. and the treatment was carried out for about 60 minutes. After cooling, 0.3 g (3% owf) of tartar emetic was added and dissolved and the cloth was further treated for 60 minutes. The treated cloth was rinsed and dehydrated.

Then, the silk cloth treated with tannic acid as above was put in a suspension of 5.0 g of tsubaki (*Camellia japonica*) ashes in 500 ml of water and mordanted by boiling for 20 minutes, with stirring. The cloth was then rinsed and dehydrated.

In 62.5 ml of water was suspended 2.5 g (25% owf) of the same basidiocarp of reishi as that used in Example 1 and the suspension was boiled for 60 minutes to prepare an extract.

This reishi extract was diluted with water to make 500 ml (bath ratio 1:50) and the silk cloth pretreated and mordanted as above was immersed in this dye bath. The temperature was increased to 85° C. with stirring, and the cloth was dyed at this temperature for about 60 minutes. After completion of dyeing, the cloth was rinsed twice, dehydrated and air-dried. The above procedure yielded the desired reishi-dyed silk cloth.

This dyed silk cloth had a natural and unique hue, with exquisite feeling and handle.

Thus, in accordance with the invention, not only silk and wool substrates but cotton, linen and other substrates which have so far been considered to be hardly dyeable by herbal dyeing can be successfully dyed with good dyeing affinity, thus enabling us to obtain dyed textile articles having natural and unique hue and feeling with unusually high color fastness to laundering.

Furthermore, these dyed textile articles have functional features, namely the antiallergic function of being kind to the skin and able to condition the skin and suppress itchy sensation and the antimicrobial function.

In addition, since tannic acid preteatment can be carried out with a natural material, such as Japanese gall, and mordanting with grass or wood ashes such as ashes of *Camellia japonica, Symplocos chinensis* f. *pilosa, Eurya japonica*, etc., all the process inclusive of dyeing with a reishi extract can be performed with naturally-occurring substances. Moreover, since cotton, linen and other substrates which have heretofore been considered to be difficult to dye by herbal dyeing can be successfully dyed, the invention meets the consumer's demand for naturalness and aspiration for health.

Therefore, the dyed textile article of the invention is not only suitable for health care clothing and other products for health maintenance but also ideal for fashionable clothing.

What is claimed is:

1. A dyed textile article treated with tannic acid and subjected to dyeing reaction with an extract of mycelia and/or basidiocarps of Ganoderma lucidum.

2. A method of producing dyed textile articles which comprises contacting a substrate textile article first with a pretreating bath containing tannic acid for tanning, then with a mordant bath containing an alumina mordant for fixation of tannic acid and mordanting, and finally with a dye bath containing an extract of mycelia or basidiocarps of Ganoderma lucidum.

3. The method claimed in claim 2 wherein an extract, or a semi-purified preparation thereof, of a tannic acid-rich plant is used as said tannic acid and ashes of an aluminum-rich grass or tree are used as said alumina mordant.

4. The method as claimed in claim 2 wherein said textile article is an article made of cotton, flax, silk or wool.

5. The method as claimed in claim 3 wherein said textile article is an article made of cotton, flax, silk or wool.

* * * * *